United States Patent [19]

Britsch et al.

[11] Patent Number: 5,251,600
[45] Date of Patent: Oct. 12, 1993

[54] ARRANGEMENT FOR DETERMINING ANGLE OF ROTATION OF TWO ROTATING PARTS

[75] Inventors: Heinz Britsch, Bietigheim-Bissingen; Nikolaus Benninger, Vaihingen/Enz; Peter Schomakers, Tamm, all of Fed. Rep. of Germany

[73] Assignee: Robert Bosch GmbH, Stuttgart, Fed. Rep. of Germany

[21] Appl. No.: 901,128

[22] Filed: Jun. 19, 1992

[30] Foreign Application Priority Data

Aug. 4, 1991 [DE] Fed. Rep. of Germany ....... 4129344

[51] Int. Cl.$^5$ ............................................. F02P 5/00
[52] U.S. Cl. ...................................................... 123/414
[58] Field of Search .................. 123/414, 90.17, 416, 123/417, 419

[56] References Cited

U.S. PATENT DOCUMENTS

| | | | |
|---|---|---|---|
| 4,715,009 | 12/1987 | Boehmler et al. | 364/565 |
| 4,850,323 | 7/1989 | Ricordi | 123/414 |
| 4,889,094 | 12/1989 | Beyer et al. | 123/414 |
| 4,926,822 | 5/1990 | Abe et al. | 123/414 |
| 4,961,410 | 10/1990 | Matsumura et al. | 123/414 |
| 5,080,052 | 1/1992 | Hlotta et al. | 123/90.17 |
| 5,088,456 | 2/1992 | Suga | 123/90.17 |
| 5,090,366 | 2/1992 | Gondek | 123/90.17 |

FOREIGN PATENT DOCUMENTS

| | | | |
|---|---|---|---|
| 3247916 | 6/1984 | Fed. Rep. of Germany | 123/435 |
| 3307833 | 8/1984 | Fed. Rep. of Germany | 123/435 |
| 4038413 | 11/1990 | Fed. Rep. of Germany | 123/435 |

*Primary Examiner*—Raymond A. Nelli
*Attorney, Agent, or Firm*—Michael J. Striker

[57] ABSTRACT

The arrangement for determining rotation angle of two rotating parts in an internal combustion engine includes a first rotating part having a protruding member extending laterally from the first rotating part, the first rotating part being connected with a crankshaft of the internal combustion engine; a second rotating part having a protruding element extending laterally, therefrom the second rotating part being connected to a camshaft of the internal combustion engine and the second rotating part being positioned adjacent to the first rotating part; a pickup device for generating a first output signal when the protruding member passes by the pickup device during rotation of the rotating parts and for generating a second output signal when the protruding element passes by the pickup device during rotation of the rotating parts; and a signal processing device for receiving the first and second output signals from the pickup device, for determining a time interval between one of the first and one of the second output signals and for calculating an angular displacement between the first and second rotating part from the time interval. The arrangement includes only one pickup device for generating both first and second output signals and the protruding member and protruding element are shaped and positioned so that each of the first output signals and the second output signals is generated by the single pickup device and the first and second output signals are different and distinguishable from each other.

6 Claims, 1 Drawing Sheet

5,251,600

ARRANGEMENT FOR DETERMINING ANGLE OF ROTATION OF TWO ROTATING PARTS

BACKGROUND OF THE INVENTION

The present invention relates to an arrangement for determination of angle of rotation of two rotating parts.

For control and regulation of internal combustion engines, especially for an electronic ignition and injection, it is necessary to know both the position of the crankshaft and the camshaft. It is known to scan a measuring wheel connected with the camshaft and provided with a signal marking by a so-called phase signal sensor which is an inductive, optical or Hall sensor and arranged in the ignition distributor or on the camshaft. In addition to the phase signal sensor, a second sensor is utilized, which scans a disc connected with the crankshaft of an internal combustion engine. Conventionally, a plurality of identical marks and also a distinguishable mark is provided on the disc. The rotational speed is determined by similar marks, which the distinguishable mark is used for generation of a reference mark signal. The above arrangement can determine the position of the crankshaft as well as the camshaft and thereby the position of both shafts relative to one another. Therefore cylinder discrimination is possible which is required for electrical ignition. Such an arrangement is disclosed, for example, in the German Published Patent Application DE-OS 3,307,833.

The known arrangement has however the disadvantage that it is very expensive. The reason is that it requires two independent sensors. It is costly and there is the danger that during rough operation of the internal combustion engine one or both sensors can fail.

Other arrangements of the above-mentioned type are also known. In known arrangements the positions of two rotatable parts can be determined and for each part an individual sensor is provided. For example, the device disclosed in German Patent document 4,038,413 is used for determination of a torque applied to a shaft, in which two increment wheels connected with the shaft are scanned. Torque is determined from their rotation relative to one another.

SUMMARY OF THE INVENTION

Accordingly, it is an object of the present invention to provide an arrangement for determining an angle of rotation of two rotating parts, which avoids the disadvantages of the prior art.

According to the present invention the arrangement for determining rotation angle of two rotating parts in an internal combustion engine having a camshaft and a crankshaft comprises a first rotating part having at least one protruding member extending laterally from the first rotating part, the first rotating part being connected with a crankshaft of the internal combustion engine; a second rotating part having at least one protruding element extending laterally therefrom, the second rotating part being connected to a camshaft of the internal combustion engine and being positioned adjacent to the first rotating part; sensor means for generating a first output signal when one of the at least one protruding members passes by the sensor means during rotation of the first rotating part and for generating a second output signal when one of the at least one protruding elements passes by the sensor means during rotation of the second rotating part, the sensor means being positioned adjacent the first and second rotating part; signal processing means for receiving the first and second output signals from the sensor means, for determining a time interval between the first and second output signals and for calculating an angular displacement between the first and second rotating part from the time interval, the signal processing means being connected to the sensor means. The arrangement and the sensor means include only one pickup device for generating each of the first and second output signals and the protruding members and the protruding elements are shaped and positioned so that each of the first output signals and second output signals is generated by the pickup device.

In one advantageous embodiment of the invention the second rotating part has only one protruding element and it is a straight tooth and the first rotating part has only one protruding member which it is an angular tooth. The angular tooth is bent and dimensioned so as to pass between the protruding element and the pickup device when the protruding member passes the protruding element during rotation of the rotating parts. The straight tooth and angular tooth are shaped and the pickup device is structured so that the first and second output signals differ from each other and are easily distinguished in the signal processing means.

When the arrangement is designed in accordance with the present invention, only one sensor is needed for determining the angle of rotation of two rotating parts, and the angular displacement of the two rotating parts relative to each other. This is made possible due to the advantageous arrangement and design of both rotating parts. Since only one sensor is needed, the arrangement is less costly than the known arrangements.

Since the angle of rotation of both rotatable parts is determined with the same sensor, it is possible to determine the angular displacement of the two rotating parts relative to each other with especially high accuracy.

In an especially advantageous manner the inventive arrangement can provide measurements of the angle of adjustment between the chain wheel rotating synchronously with the crankshaft and the camshaft of an internal combustion engine. It is possible therefore to determine quantitatively in internal combustion engines with camshaft distribution, the changing adjustment angle at discrete time points.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
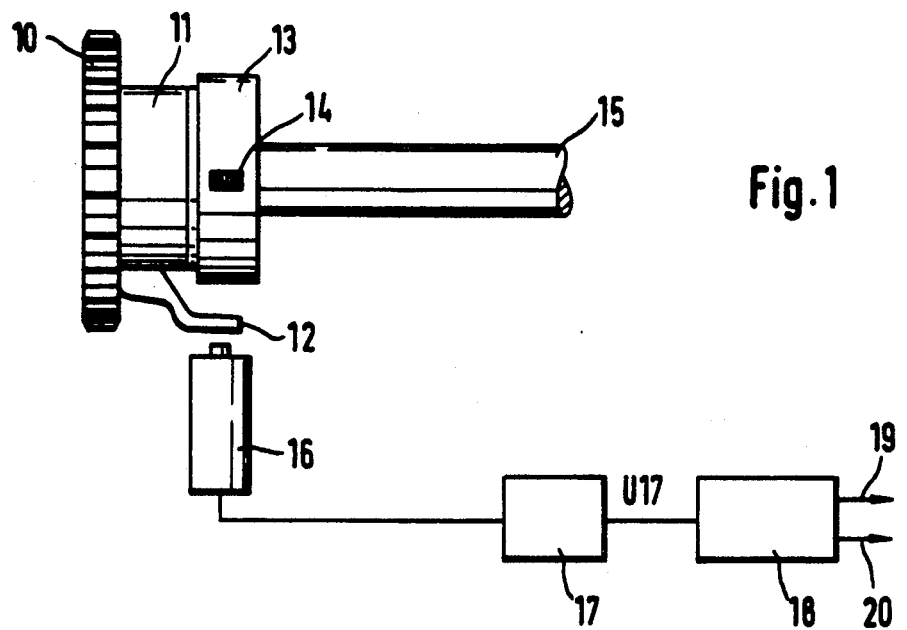
FIG. 1 is a side view showing an arrangement for determining angle of rotation of two rotatable parts in accordance with the present invention.

An embodiment of the arrangement according to the present invention is shown in FIG. 1. A so-called chain wheel 10 is in fixed connection with an unshown crankshaft of an internal combustion engine. A first disc 11 is connected with the chain wheel 10 and has a protruding member 12. The protruding member 12 comprises a curved tooth which laterally protrudes from the first disc 11.

Figure 2:
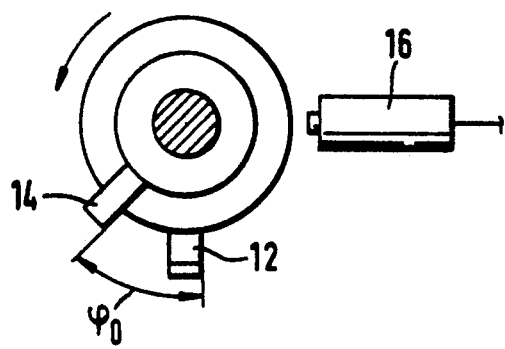
FIG. 2 is an end-on view showing a position of a chain wheel or crankshaft relative to the position of the camshaft for a first angle of rotation $\phi_0$.
Figure 3:
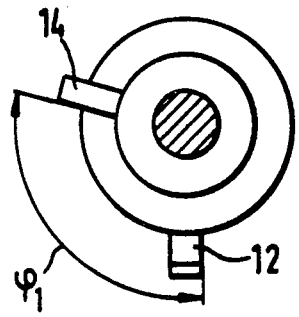
FIG. 3 is another end-on view showing the position of the chain wheel or crankshaft relative to the position of the camshaft for a second angle of rotation $\phi_1$.

A second disc 13 has a protruding element 14 and is connected with a camshaft 15. Second disc 13 is arranged adjacent to the first disc 11. Therefore the protruding member 12 protruding from the first disc 11 is formed so as to be close to the second disc 13 and however is spaced from the second disc 13. An end-on view of the arrangement is shown in FIG. 2 and FIG. 3. FIG. 2 is an illustration of an adjustment angle $\phi_0$ between chain wheel and the camshaft, while FIG. 3 is an illustration of an adjustment angle $\phi_1$ between the chain wheel and the camshaft.

The arrangement shown in FIG. 1 is scanned by a stationary pickup device 16. The pickup device 16 is arranged so that both protruding member 12 and protruding element 13 pass near the pickup device in immediate proximity to the latter.

When the protruding member 12 and protruding element 13 pass by the pickup device 16, voltage pulses are generated and supplied to a signal processing circuit 17 and are converted to rectangular voltage pulses U17 and received and processed in a subsequent control unit 18, for example a microprocessor. Therefore the control device 18 can control ignition and injection as well as other functions by sending control signals from outputs 19 and 20.

In the control device 18 in a conventional manner from the voltage pulses U17 or from the time intervals between the flanks of the voltage pulses U17 generated by the protruding members or elements, the rotational speed and the position of a reference mark are determined or the cylinder-1-discrimination is performed. The exact course of the signal processing is not described here, but is disclosed, for example, in U.S. Pat. No. 4,715,009 for measurements of rotational speed and for determination of the position of the reference marks or elements, and in U.S. Pat. No. 4,889,094 for cylinder-1-discrimination.

Figure 4:
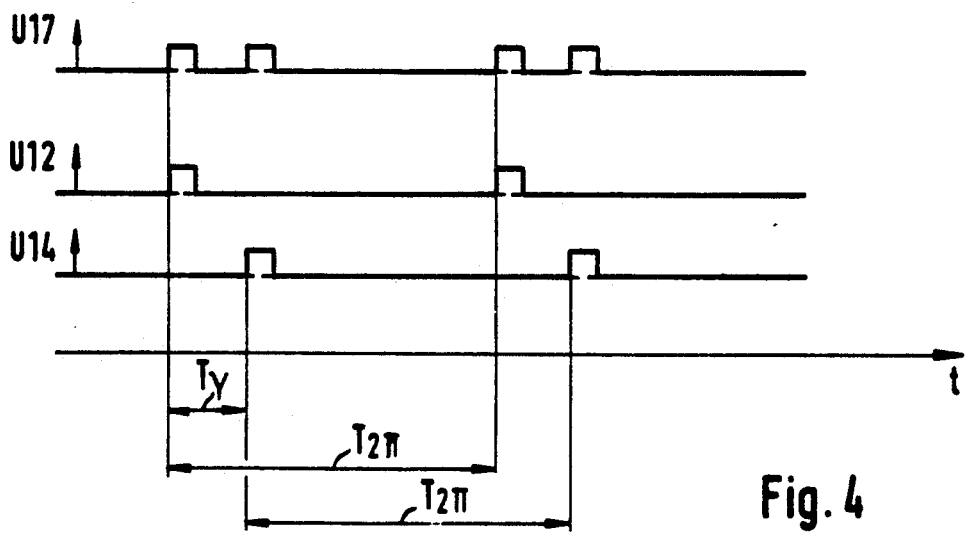
FIG. 4 is a graphical illustration showing a timing diagram including sensor signals to be evaluated (after the required processing steps necessary to obtain square pulses).

The arrangement shown in FIG. 1 can additionally determine the adjustment angle between the chain wheel 10 and the camshaft 15. This can occur by processing the voltage pulse sequence as shown in FIG. 4. It should be mentioned that with the arrangement selected in accordance with FIG. 2 the first occurring voltage pulse is generated by the protruding member 12 and the second occurring voltage pulse is generated by the protruding element 14. In FIG. 4 the voltage pulses are shown versus the time, t.

The time interval between similar sides or flanks (i.e. two leading or trailing edges) of a voltage pulse U12 and a voltage pulse U14 is defined as $T_{100}$. The time interval between two voltage pulses U12 or two voltage pulses U14 is defined as $T_{2\pi}$.

With the value represented in FIG. 4 an instantaneous adjustment angle $\phi$ is obtained, assuming an approximately constant rotational speed in accordance wit the following equation.

$$\phi = (T_\phi / T_{2\pi}) \times 2\pi \tag{Ia}$$

$$\phi_0 = (T_{\phi 0} / T_{2\pi}) \times 2\pi \tag{Ib}$$

wherein the times $T_\phi$ and $T_{2\pi}$ pertaining to the angles $\phi$ and $2\pi$ are produced by corresponding processing of the pulse sequences in the control device, especially by time measurements.

With the angular positions $\phi_0$ and $\phi_1$ shown in FIGS. 2 and 3 the adjustment angle is defined as:

$$\phi = \phi_1 - \phi_0 \tag{II}$$

wherein $\phi_0$ leads conventinoally to an impact position.

Since the control devices as mentioned hereinabove also determines the rotational speed, the angles $\phi_0$ and $\phi_1$ can be also computed by the measurement of the time $T_{\phi 0}$, since the time $T_{2\pi}$ is exactly the inverse value of the camshaft rotational speed, n ($T_{2\pi} = 1/n$).

The above-described determination of the adjustment angle between the chain wheel 10 and the camshaft 15 is particularly desirable for internal combustion engines in which a camshaft adjustment is performed. The angular position of the camshaft with respect to the position of the crankshaft or chain wheel is adjusted depending on the operation conditions of the internal combustion engine. Therefore the ignition and/or the fuel injection of the internal combustion engine can be controlled. This type of internal combustion engine is disclosed, for example, in the German Published Patent Application DE-OS 3,247,916.

The determination of the adjustment angle can be performed at discrete time points. The time intervals between the time points are dependent on the number of protruding members or elements and the rotational speed.

In the example shown in FIGS. 1 to 3 each of two discs has a protruding member or element. When necessary, also several protruding members or elements can be provided on one disc or several protruding elements can be provided on each disc. It is further possible to form the protruding members 12 and the protruding elements 14 so that the voltage pulses U12 and U14 are different in their length and in their height in a characteristic manner. It is also possible to form one of the protruding members or elements 12,14 as a double tooth or in any other, easily recognizable manner.

In order to perform a simple cylinder-1-discrimination from the position of the camshaft protruding element in the arrangement of FIGS. 1 to 3, the following possibilities are provided:

Both voltage pulse signals are utilized. In this case the structure of the disc is such that the angle $\phi_1$ between both the protruding member and the protruding element remains smaller than 180° (with respect to the camshaft) over the whole adjustment range.

If the signal is processed which is generated by the protruding member of the chain wheel, which is not adjusted relative to the crankshaft, it is necessary that the protruding element of the chain wheel or the disc connected with it and the protruding member of the disc connected with the camshaft be formed differently so that the signals from the protruding member and the protruding element are clearly distinguishable.

In an internal combustion engine, which has a separate crankshaft position sensor with conventional disc and pickup device and also an inventive pickup device for simultaneous scanning of a wheel connected with the camshaft and chain wheel, emergency operation can occur in the event of a failure of the crankshaft position sensor. The reason for this is that, as mentioned, from the signals of the camshaft/chain wheel-pickup device, the crankshaft position can be determined independently of the crankshaft sensor.

While the invention has been illustrated and embodied in an arrangement for determining rotation angle of two rotating parts, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

1. An arrangement for determining rotation angle of two rotating parts in internal combustion engines having a camshaft and a crankshaft, comprising
a first rotating part having at least one protruding member extending laterally from the first rotating part, said first rotating part being connected with a crankshaft of an internal combustion engine;
a second rotating part having at least one protruding element extending laterally therefrom, said second rotating part being connected to a camshaft of the internal combustion engine and said second rotating part being positioned adjacent to said first rotating part;
sensor means for generating a first output signal when one of said at least one protruding members passes by said sensor means during rotation of said first rotating part and for generating a second output signal when one of said at least one protruding elements passes by said sensor means during rotation of said second rotating part, said sensor means being positioned adjacent said first and second rotating part;
signal processing means for receiving said first and second output signals from said sensor means, for determining a time interval between said first and second output signals and for calculating an angular displacement between the first and second rotating part to determine an adjustment angle between the crankshaft and the camshaft, said signal processing means being connected to said sensor means;
wherein said sensor means includes only one pickup device for generating each of said first and said second output signals and said at least one protruding member and said at least one protruding element are shaped and positioned so that each of said first output signals and said second output signals is generated by said pickup device.

2. An arrangement as defined in claim 1, wherein said second rotating part has only one of the at least one protruding elements and said protruding element comprises a straight tooth and said first rotating part has only one of the protruding members and said protruding member comprises an angular tooth, said angular tooth being shaped and dimensioned so that a portion of said angular tooth passes between said protruding element and said pickup device in close proximity to said pickup device when said protruding member passes said protruding element during rotation of the rotating parts, and wherein said straight tooth and said angular tooth are shaped and said pickup device is structured so that said first and second output signals differ form each other and are distinguishable in said signal processing means.

3. An arrangement as defined in claim 1, wherein said second rotating part has only one of the at least one protruding elements and said protruding element comprises a double tooth.

4. An arrangement as defined in claim 1, wherein the signal processing means includes control means for generating data signals required for controlling the internal combustion engine according to the angular displacement between the rotating parts and means for distinguishing an emergency running condition of said internal combustion engine from said data signals.

5. An arrangement as defined in claim 1, wherein the first rotating part is a chain wheel of the internal combustion engine and the chain wheel is connected to the camshaft to drive the camshaft and further comprising means for adjusting the angular displacement of the camshaft and the chain wheel, said angular displacement of the camshaft and the chain wheel corresponding to said angular displacement of the first and second rotating parts determined in the signal processing means.

6. An arrangement as defined in claim 1, wherein said first and second output signals are square voltage pulses having flanks and said time interval is determined by measuring a time interval between receipt of similar flanks of one of said square voltage pulses of said first output signal and one of said square voltage pulses of said second output signal in said signal processing means.

* * * * *